Sept. 16, 1958   R. T. CORNELIUS   2,852,320
BEARING CONSTRUCTION
Filed Sept. 4, 1956

INVENTOR
RICHARD T CORNELIUS
ATTORNEYS

United States Patent Office 2,852,320
Patented Sept. 16, 1958

2,852,320

BEARING CONSTRUCTION

Richard T. Cornelius, Minneapolis, Minn.

Application September 4, 1956, Serial No. 607,946

6 Claims. (Cl. 308—174)

The herein disclosed invention relates to bearing construction and particularly to a bearing construction subject to both radial and end thrusts.

An object of the invention resides in providing a bearing construction in which loading is properly distributed to both the radial and end thrust bearings.

Another object of the invention resides in providing a bearing construction in which the parts independently yield in accordance with the stresses set up therein.

A still further object of the invention resides in providing a bearing construction in which flexure of the rotor is compensated for and in which the radial bearing accommodates axial movement of the rotor to compensate for movement occasioned in the loading of the end thrust bearing.

Another object of the invention resides in providing a bearing construction in which the rollers of the end thrust bearing may move radially to compensate for movement occasioned in the loading of the radial thrust bearing.

An object of the invention resides in providing a race for the end thrust bearing formed with a spherical socket and in forming the race for the radial thrust bearing with a spherical surface engaging the socket of said end thrust race.

An object of the invention resides in constructing the rollers for the end thrust bearing with spherical surfaces of small curvature.

Another object of the invention resides in constructing the end thrust race with grooves in the same forming conduits to conduct lubricant from one side thereof and to the other.

Other objects of the invention reside in the novel combination and arrangement of parts and in the details of construction hereinafter illustrated and/or described.

Figure 1:
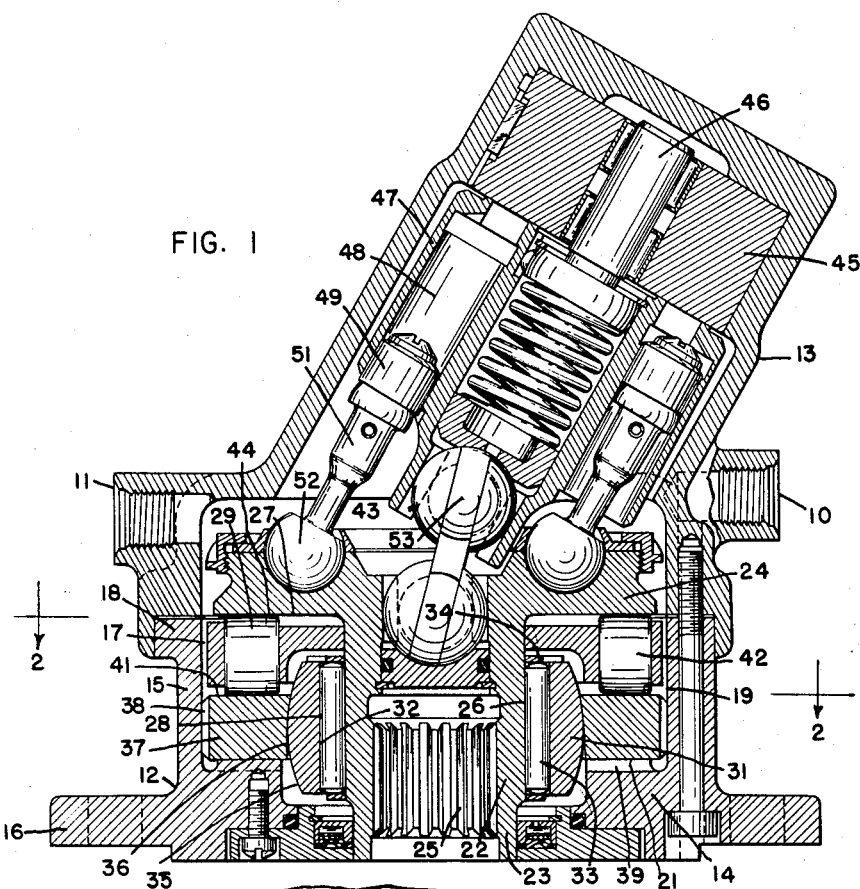
Fig. 1 is an elevational-sectional view of a hydraulic pump illustrating an embodiment of the invention and taken through the center of the pump.
Figure 2:
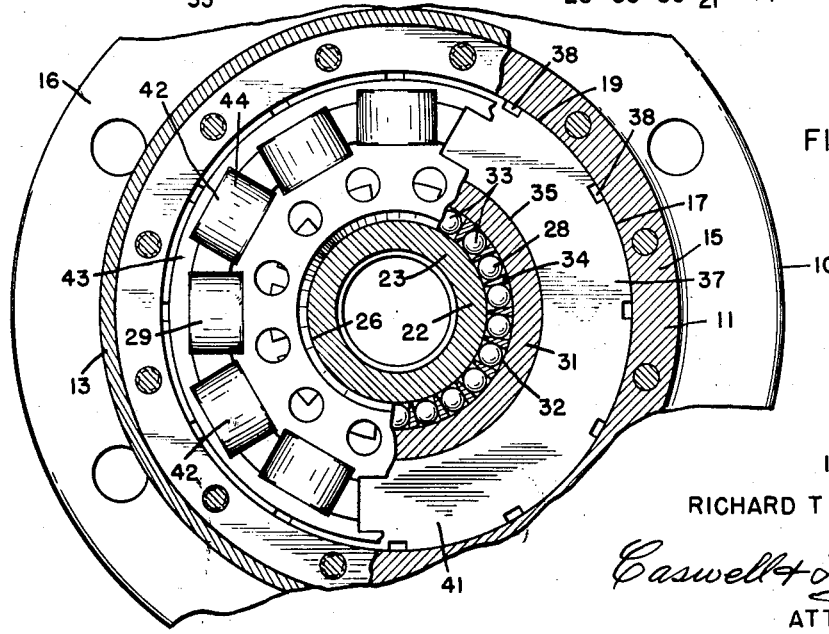
Fig. 2 is a plan sectional view taken on line 2—2 of Fig. 1.

The invention has been illustrated as embodied in a pump 10 which comprises a case 11 including a base 12 and on which a dome 13 is mounted. Base 12 is generally circular in form, being provided with an end wall 14 and an annular wall 15 extending upwardly therefrom. Encircling the base 12 is a flange 16 which is adapted to be mounted on the surface of the support to which the pump is to be attached. By means of this construction, a chamber 17 is formed within the base 12. The upper end of the wall 15 is formed with a rim 18 and to which the dome 13 is bolted. The pump may be mounted in a horizontal position or in a vertical position as illustrated.

The chamber 17 within the base 12 is formed by a cylindrical bore 19 in the annular wall 15 and by a radial surface 21 on the end wall 14 normal to said bore. Rotatably mounted within the case 11 and disposed principally within the base 12 is a rotor 22. This rotor is formed with a tubular portion 23 having a flange 24 issuing outwardly therefrom. Within the tubular portion 23 is provided splines 25 and to which any suitable driving member may be connected. The tubular portion has a cylindrical surface 26 while the flange 24 has a radial surface 27 normal to the axis of the surface 26.

The rotor 22 is supported for rotating movement within the case 11 by means of a radial roller bearing 28 and an end thrust roller bearing 29. The surface 26 forms part of the radial bearing 28 and cooperating with the same is a race 31 which has a cylindrical surface 32 coaxial with reference to the surface 26 and spaced therefrom. Between the surfaces 32 and 26 are disposed rollers 33. These rollers are mounted in a cage 34 which engages the race 31 and holds the rollers in proper operating position.

The race 31 has a convex spherical outer surface 35 which is received in a spherical socket 36 formed in a race 37 constituting a part of the bearing 29. This race is received in the chamber 17 and bears against the bore 19 of said chamber and is centered thereby. The said race rests upon the surface of the end wall 14 of base 12 and is pressed into position to hold the same from rotation. The race 37 has grooves 38 extending through the outermost portion thereof while the bottom wall 14 of base 12 has grooves 39 communicating with the grooves 38. These grooves conduct lubricant contained within the chamber 17 from the top to the bottom of the bearing 28.

The end thrust bearing 29 utilizes the radial surface 27 of the flange 24 of rotor 22 and also the race 37. This race is formed with the radial surface 41 which is parallel to the surface 27 and spaced therefrom. Between the surfaces 27 and 41 are disposed rollers 42 which are mounted in a cage 43. This cage engages the surface 26 of the tubular portion 23 of rotor 22 and holds the rollers in place. The rollers have crowned surfaces 44 which are spherical in form having but slight curvature and which engage the surfaces 27 and 41 of the bearing.

The remainder of the pump comprises a valve head 45 fixed in the upper end of the dome 13 and which rotatably supports a spindle 46. This spindle carries a cylinder head 47 and in which are formed cylinder bores 48. Pistons 49 slide in said cylinders and have attached to them connecting rods 51 which are connected by means of ball and socket joints 52 with the flange 24 of the rotor 22. A universal joint 53 connects the cylinder head 47 with the rotor 22 and drives the same from the said rotor. The construction of the pump proper forming no particular feature of the instant invention, has not been described or illustrated in detail.

In operation radial thrust applied to the rotor 22 causes the rotor to move a small distance towards one side of the annular wall 15 of case 11. This movement is made possible in the end thrust bearing 29 by the use of the parallel planiform surfaces 27 and 41 of the rotor 22 and the race 37. To prevent friction between the rollers 42 and the surfaces with which they contact, the rollers are made spherical. However, the curvature is slight so sufficient bearing area results. These rollers can hence slide radially along the surfaces 27 and 41, and likewise the rotor may move radially relative to the race without affecting the operation of the device and thus compensate for the movement of the parts due to the loading of the radial bearing. In like manner, the pump when compressing the fluid in the cylinder bores 48, exerts a greater pressure on one side of the flange 24 of rotor 22 than on the other. This causes a slight movement of the flange toward the race 37 on one side of said race and not on the other. Such swinging movement of the rotor is compensated for by the socket 36 in the spherical surface 35. At the same time, the rollers 33 may slide axially along the surfaces 32 and 26 and compensate for such movement.

It will readily be comprehended that each bearing compensates for eccentric loading thereof independently of the other bearing, thus the loading may vary without affecting the operation of the bearing and without causing undue stresses in the parts of the same. A pump constructed with the bearings of the instant invention is extremely free running and will not readily heat up due to stresses set up in the bearings.

Changes in the specific form of the invention, as herein described, may be made within the scope of what is claimed without departing from the spirit of the invention.

Having described the invention, what is claimed as new and desired to be protected by Letters Patent is:

1. In combination, a case, having a chamber therein, a rotor disposed within said chamber and having a radial surface and a cylindrical surface, an end thrust race disposed within said chamber and having a radial surface substantially parallel to the radial surface of said rotor, rollers disposed between and contacting said surfaces, said race being fixed relative to said case, said race having a spherical socket facing the axis of said rotatable member and whose center lies along said axis and is disposed within the confines of said race, a radial thrust race encircling said rotor and having a cylindrical bore concentric with and spaced from the cylindrical surface of said rotor, rollers disposed between said cylindrical bore and surface and engaging the same, said radial thrust race having an outer convex spherical surface whose center coincides with that of said end thrust race and which engages said first named spherical surface.

2. In combination a support, means fixed relative to said support providing a spherical socket, a race having a convex spherical surface received within said socket and a cylindrical bore whose axis contains the center of said spherical socket, a rotor received within said bore and having a cylindrical surface coaxial with and spaced from said bore, axially extending rollers disposed between and engaging said cylindrical surface and said bore, means fixed relative to said support and having a radial surface normal to the axis of said rotor, said rotor having a portion disposed axially beyond said race and having a radial surface normal to said axis and spaced from said first named radial surface and radially extending rollers disposed between and engaging said radial surfaces.

3. In combination a support, means fixed relative to said support and providing a spherical socket, a race having a convex spherical surface received within said socket and a cylindrical bore whose axis contains the center of said spherical socket, a rotor received within said bore and having a cylindrical surface coaxial with and spaced from said bore, axially extending rollers disposed between and engaging said cylindrical surface and said bore, means fixed relative to said support and having a radial surface normal to the axis of said rotor, said rotor having a portion disposed axially beyond said race and having a radial surface normal to said axis and spaced from said first named radial surface and radially extending rollers whose diameters decrease toward the ends of said rollers, said rollers being disposed between and engaging said radial surfaces.

4. In combination a support, means fixed relative to said support and providing a spherical socket, a race having a convex spherical surface received within said socket and a cylindrical bore whose axis contains the center of said spherical socket, a rotor received within said bore and having a cylindrical surface coaxial with and spaced from said bore, axially extending rollers disposed between and engaging said cylindrical surface and said bore, means fixed relative to said support and having a radial surface normal to the axis of said rotor, said rotor having a portion disposed axially beyond said race and having a radial surface normal to said axis and spaced from said first named radial surface and radially extending rollers having spherical surfaces, said rollers being disposed between said radial surfaces and said spherical surfaces thereof engaging said radial surfaces.

5. In combination, a support, having a chamber therein formed with an annular wall providing a cylindrical surface and an end wall providing a radial surface, an end thrust race received in said chamber and engaging said cylindrical and radial surfaces of said support, said race having a radial end surface and a spherical socket whose center lies in the axis of the cylindrical surface of said annular wall, a rotor disposed within said chamber and having a radial surface substantially parallel to the radial surface of said race, rollers disposed between said radial surfaces and engaging the same, a radial thrust race having a convex spherical surface whose center coincides with the center of said socket and engaging said socket and a cylindrical bore with its axis containing the center of said spherical surface, said rotor having a cylindrical surface coaxial with the cylindrical bore of said radial thrust race, and spaced from said bore, and rollers disposed between said cylindrical surface and bore and engaging the same.

6. In combination, a support, having a chamber therein formed with an annular wall providing a cylindrical surface and an end wall providing a radial surface, an end thrust race received in said chamber and engaging said cylindrical and radial surfaces of said support, grooves in said race forming passageways for conducting lubricant from the portion of said chamber on one side of said race to the other, said race having a radial end surface and a spherical socket whose center lies in the axis of the cylindrical surface of said annular wall, a rotor disposed within said chamber and having a radial surface substantially parallel to the radial surface of said race, rollers disposed between said radial surfaces and engaging the same, a radial thrust race having a convex spherical surface whose center coincides with the center of said socket and engaging said socket and a cylindrical bore with its axis containing the center of said spherical surface, said rotor having a cylindrical surface coaxial with the cylindrical bore of said radial thrust race, and spaced from said bore, and rollers disposed between said cylindrical surface and bore and engaging the same.

References Cited in the file of this patent

UNITED STATES PATENTS

| | | |
|---|---|---|
| 1,932,528 | Matthews | Oct. 31, 1933 |
| 2,337,511 | Wahlmark | Dec. 21, 1943 |

FOREIGN PATENTS

| | | |
|---|---|---|
| 709,768 | Germany | Sept. 1, 1941 |